United States Patent
Tamaoka et al.

(10) Patent No.: US 11,555,111 B2
(45) Date of Patent: *Jan. 17, 2023

(54) POLYACETAL RESIN COMPOSITION

(71) Applicant: Polyplastics Co., Ltd., Tokyo (JP)

(72) Inventors: Akihiro Tamaoka, Shizuoka (JP); Hatsuhiko Harashina, Shizuoka (JP); Tomohiro Monma, Shizuoka (JP)

(73) Assignee: POLYPLASTICS CO., LTD., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/287,312

(22) PCT Filed: Dec. 5, 2019

(86) PCT No.: PCT/JP2019/047563
§ 371 (c)(1),
(2) Date: Apr. 21, 2021

(87) PCT Pub. No.: WO2020/129663
PCT Pub. Date: Jun. 25, 2020

(65) Prior Publication Data
US 2021/0355314 A1  Nov. 18, 2021

(30) Foreign Application Priority Data
Dec. 21, 2018  (JP) .............. JP2018-239103

(51) Int. Cl.
*C08L 59/00* (2006.01)
*C08K 5/098* (2006.01)
*C08K 5/25* (2006.01)
*C08K 5/3445* (2006.01)

(52) U.S. Cl.
CPC .............. *C08L 59/00* (2013.01); *C08K 5/098* (2013.01); *C08K 5/25* (2013.01); *C08K 5/3445* (2013.01); *C08L 2201/08* (2013.01); *C08L 2203/30* (2013.01)

(58) Field of Classification Search
CPC .................. C09L 59/00; C08K 5/25
See application file for complete search history.

(56) References Cited

U.S. PATENT DOCUMENTS

| | | |
|---|---|---|
| 6,753,363 B1 | 6/2004 | Harashina |
| 2007/0054998 A1 | 3/2007 | Harashina |
| 2007/0073007 A1 | 3/2007 | Harashina |
| 2010/0093901 A1 | 4/2010 | Kawaguchi et al. |
| 2015/0299544 A1 | 10/2015 | Markgraf et al. |
| 2016/0280852 A1 | 9/2016 | Masuda et al. |
| 2021/0355314 A1 | 11/2021 | Tamaoka et al. |

FOREIGN PATENT DOCUMENTS

| | | |
|---|---|---|
| EP | 2098569 A1 | 9/2009 |
| JP | 2005-162913 A | 6/2002 |
| JP | 2003-192812 A | 7/2003 |
| JP | 2005-163019 A | 6/2005 |
| JP | 2005-264102 A | 9/2005 |
| JP | 2006-257166 A | 9/2006 |
| JP | 2006-045489 A | 12/2006 |
| JP | 2008-156489 A | 7/2008 |
| JP | 2008-260874 A | 10/2008 |
| JP | 2008-031348 A | 12/2008 |
| JP | 2009-286874 A | 12/2009 |
| JP | 2010-006903 A | 1/2010 |
| JP | 2013-237742 A | 11/2013 |
| JP | 2015-078387 A | 1/2015 |
| JP | 2015-514840 A | 5/2015 |
| JP | 2016-089069 A | 5/2016 |
| JP | 2017-082098 A | 5/2017 |
| JP | 2019-065233 A | 4/2019 |
| JP | 2020-100713 A | 7/2020 |
| WO | WO 2001/05888 A1 | 1/2001 |
| WO | WO 2005/044917 A1 | 5/2005 |
| WO | WO 2005/049728 A1 | 6/2005 |
| WO | WO 2013/156227 A1 | 10/2013 |
| WO | WO 2019/167463 A1 | 9/2019 |

OTHER PUBLICATIONS

Office Action issued in U.S. Appl. No. 17/593,231, dated Feb. 14, 2022.

*Primary Examiner* — Brieann R Johnston
(74) *Attorney, Agent, or Firm* — Knobbe, Martens, Olson & Bear LLP

(57) ABSTRACT

A polyacetal resin composition capable of keeping the generation of formaldehyde from a molded article at a very low level and stably keeping mold deposits at a minimum during molding. The polyacetal resin composition includes at least (A) 100 parts by mass of a polyacetal polymer, (B) 0.01-0.50 parts by mass of an aliphatic carboxylic hydrazide, (C) 0.001-0.50 part by mass of a hydantoin compound having two hydrazinocarbonylalkyl groups, and (D) 0.001-0.30 part by mass of an alkaline earth metal salt of an aliphatic carboxylic acid. The total amount of (B) and (C) is 0.03-0.55 part by mass per 100 parts by mass of the (A) polyacetal polymer.

3 Claims, No Drawings

POLYACETAL RESIN COMPOSITION

This application is the U.S. National Phase under 35 U.S.C. § 371 of International Application PCT/JP2019/047563, filed Dec. 5, 2019, designating the U.S., and published in Japanese as WO 2020/129663 on Jun. 25, 2020, which claims priority to Japanese Patent Application No. 2018-239103, filed Dec. 21, 2018, the entire content of which is incorporated herein by reference.

TECHNICAL FIELD

The present invention relates to a polyacetal resin composition that has excellent processability and stability, that significantly suppresses the amount of formaldehyde generated from a molded article thereof, and that stably suppresses a mold deposit upon molding.

BACKGROUND ART

Polyacetal resins have many excellent properties and molded articles thereof have been utilized in a wide range of fields, but the polyacetal resins have a property of easily decomposing under a heat-oxidative atmosphere, an acidic condition, or an alkaline condition due to their chemical structural characteristics. Therefore, with respect to the polyacetal resins, there has been a desire to increase thermostability and suppress formaldehyde generated during a molding process or from a molded article thereof. Low thermostability causes polymers to decompose when exposed to heat during an extrusion or molding process thereby generating a deposit on a mold (mold deposit) or reducing moldability or a mechanical physical property.

Furthermore, formaldehyde is generated from molded articles of the polyacetal resins in an extremely small amount under ordinary use conditions, but the generated formaldehyde is chemically active and undergoes oxidation to be converted to formic acid, which adversely affects heat resistance of the polyacetal resins. Additionally, when used for components of electrical and electric equipment, formaldehyde or formic acid, which is an oxide of formaldehyde, may corrode metallic contact components or deposits of organic compounds may contribute to discoloration or contact faults.

Therefore, the polyacetal resins have been formulated with antioxidants or other stabilizers for stabilization. The antioxidants known to be added to the polyacetal resins include sterically-hindered phenol compounds (hindered phenols) and sterically-hindered amine compounds (hindered amine), and the other stabilizers such as melamine, polyamide, alkali metal hydroxides, and alkali earth metal hydroxides have been used. Furthermore, the antioxidants are usually used in combination with the other stabilizers.

However, it is difficult to greatly reduce formaldehyde, in particular, formaldehyde generated from the molded articles only by formulating polyacetal resins having an ordinary formaldehyde quality with such all-purpose stabilizers. Moreover, polyacetal resin compositions in which various compounds are formulated have been disclosed in order to solve the above-mentioned problem and reduce the amount of formaldehyde generated.

For example, the technique in which a polyacetal resin having a specific end group, a hindered phenol-based antioxidant, a hydrazide compound, and an isocyanate compound are used in combination with each other has been disclosed (Patent Document 1). Furthermore, the technique in which a hindered phenol-based antioxidant, a hydrazide compound, and an alkaline earth metal salt of a specific carboxylic acid are allowed to coexist has also been disclosed (Patent Document 2).

Patent Document 1: Japanese Unexamined Patent Application, Publication No. 2009-286874
Patent Document 2: Japanese Unexamined Patent Application, Publication No. 2006-45489

DISCLOSURE OF THE INVENTION

Problems to be Solved by the Invention

According to the technique disclosed in Patent Document 1, the mold deposit generated during molding of the polyacetal resins can be reduced to a considerably low level. However, although the technique is effective for reducing the mold deposit, formaldehyde generation cannot be sufficiently suppressed. Furthermore, the technique disclosed in Patent Document 2 is not a stable molding technique since an effect of suppressing formaldehyde from being generated is exerted, but an effect of suppressing the mold deposit is insufficient.

An object of the present invention is to provide a polyacetal resin composition that can suppress the generation of formaldehyde from a molded article to an extremely low level and that stably suppresses a mold deposit upon molding.

Means for Solving the Problems

The object of the present invention has been achieved by the followings.

A first aspect of the present invention relates to a polyacetal resin composition including at least:
100 parts by mass of (A) a polyacetal polymer;
0.01 to 0.50 parts by mass of (B) an aliphatic carboxylic hydrazide;
0.001 to 0.50 parts by mass of (C) a hydantoin compound having two hydrazinocarbonylalkyl groups; and
0.001 to 0.30 parts by mass of (D) an alkaline earth metal salt of an aliphatic carboxylic acid,
a total amount of the (B) and the (C) being 0.03 to 0.55 parts by mass relative to 100 parts by mass of the (A) polyacetal polymer.

A second aspect of the present invention relates to the polyacetal resin composition as described in the first aspect, in which the (B) aliphatic carboxylic hydrazide is sebacic dihydrazide.

A third aspect of the present invention relates to the polyacetal resin composition as described in the first or second aspect, in which the (D) alkaline earth metal salt of an aliphatic carboxylic acid is at least one selected from calcium stearate and calcium 12-hydroxystearate.

A fourth aspect of the present invention relates to the polyacetal resin composition as described in any one of the first to third aspects, in which the (C) hydantoin compound having two hydrazinocarbonylalkyl groups is 1,3-bis(hydrazinocarbonoethyl)-5-isopropylhydantoin.

Effects of the Invention

According to the present invention, it is possible to provide a polyacetal resin composition that significantly reduces the amount of formaldehyde generated and that stably suppresses a mold deposit upon molding; and a molded article thereof.

PREFERRED MODE FOR CARRYING OUT THE INVENTION

The present invention will be described in detail.
<(A) Polyacetal Polymer>

An (A) polyacetal polymer to be used in the present invention may a homopolymer containing an oxymethylene group (—OCH$_2$—) as a building block or a copolymer containing another comonomer unit other than the oxymethylene unit, with the copolymer being preferred.

Generally, the polyacetal polymer is produced by copolymerizing formaldehyde or a cyclic compound of formaldehyde serving as a main monomer and a compound selected from cyclic ethers and cyclic formals serving as a comonomer, and usually is stabilized by removing an end unstable moiety through thermal decomposition, (alkaline) hydrolysis, etc.

In particular, trioxane, a cyclic trimer of formaldehyde, is generally used as the main monomer. The trioxane is generally obtained by reacting an aqueous formaldehyde solution in the presence of an acidic catalyst and is used following purification by a method such as distillation. The trioxane used for polymerization preferably contains impurities, such as water, methanol, and formic acid, in an amount as small as possible. As the comonomer, common cyclic ethers and cyclic formals, and glycidyl ether compounds which can form branched structures or cross-linked structures may be used alone or in a combination of two or more.

Such a polyacetal copolymer as mentioned above can be generally obtained by adding an appropriate amount of a molecular weight adjusting agent and allowing cationic polymerization to occur with a cationic polymerization catalyst. The molecular weight adjusting agent, the cationic polymerization catalyst, a polymerization method, a polymerization device, an inactivation treatment of the catalyst following polymerization, an end stabilizing treatment method of a crude polyacetal copolymer obtained by polymerization, etc. to be used are known from many publications, any of which can be basically used.

A molecular weight of the polyacetal copolymer to be used in the present invention is not particularly limited, but is preferably about 10,000 to 400,000 in terms of weight average molecular weight corresponding to PMMA (polymethyl methacrylate) as measured by SEC (size exclusion chromatography). Furthermore, the polyacetal copolymer preferably has a melt index (measured at 190° C. and 2.16 kg load according to ASTM-D1238), which is an index of flowability of a resin, of 0.1 to 100 g/10 min and further preferably 0.5 to 80 g/10 min.

The (A) polyacetal polymer to be used in the present invention particularly preferably has a specific end property. Specifically, an amount of a hemiformal end group is 1.0 mmol/kg or less, an amount of a formyl end group is 0.5 mmol/kg or less, and an amount of an unstable end is 0.5% by mass or less. Here, the hemiformal end group is represented by —OCH$_2$OH, and may be referred to as a hydroxymethoxy group or a hemiacetal end group. Furthermore, the formyl end group is represented by —CHO. The amounts of such hemiformal and formyl end groups can be determined by $^1$H-NMR measurement, and for a specific measurement method thereof, reference can be made to the method described in Japanese Unexamined Patent Application, Publication No. 2001-11143.

Furthermore, the amount of the unstable end refers to an amount of a moiety which is present at end portions of the polyacetal polymer and which easily decomposes due to instability against heat or a base. Such an amount of the unstable end is determined as follows: 1 g of the polyacetal copolymer is placed in a pressure-resistant closed vessel along with 100 mL of a 50% (by volume) aqueous methanol solution containing 0.5% (by volume) of ammonium hydroxide, subjected to a heat treatment at 180° C. for 45 minutes, and then cooled. The vessel is opened, and an amount of formaldehyde which has decomposed and eluted into the resultant solution is quantified and is represented as by mass relative to the polyacetal copolymer.

The (A) polyacetal polymer to be used in the present invention preferably has the amount of the hemiformal end group of 1.0 mmol/kg or less and further preferably 0.6 mmol/kg or less. The amount of the formyl end group is preferably 0.5 mmol/kg or less and further preferably 0.1 mmol/kg or less. The amount of the unstable end is preferably 0.5% by mass or less and further preferably 0.3% by mass or less. Lower limits of the amounts of the hemiformal end group, the formyl end group, and the unstable end are not particularly limited.

The (A) polyacetal polymer having the specific end property as mentioned above can be produced by reducing impurities contained in the monomer and the comonomer, choosing a production process, and optimizing production conditions thereof.

A method for producing the (A) polyacetal polymer having the specific end property meeting the requirements of the present invention may be, for example, the method described in Japanese Unexamined Patent Application, Publication No. 2009-286874. However, the method is not limited thereto.

In the present invention, a polyacetal resin having a branched- or cross-linked-structure may be added to the (A) polyacetal polymer, in this case, the polyacetal resin is formulated in an amount of 0.01 to 20 parts by mass and particularly preferably 0.03 to 5 parts by mass relative to 100 parts by mass of the (A) polyacetal polymer.

<(B) Aliphatic Carboxylic Hydrazide>

Examples of a (B) aliphatic carboxylic hydrazide to be used in the present invention include adipic dihydrazide, sebacic dihydrazide, dodecanedioic dihydrazide, stearic hydrazide, and the like. Preferred is sebacic dihydrazide, which can trap formaldehyde and significantly suppress the mold deposit, which is normally generated, when used in combination with hydantoin-based hydrazide.

In the present invention, the (B) is added in an amount of 0.01 to 0.50 parts by mass and preferably 0.02 to 0.30 parts by mass relative to 100 parts by mass of the (A) polyacetal polymer.

<(C) Hydantoin Compound Having Two Hydrazinocarbonylalkyl Groups>

Examples of the (C) hydantoin compound having two hydrazinocarbonylalkyl groups of the present invention (hereinafter may be abbreviated as hydantoin compound) include 1,3-bis(hydrazinocarbonoethyl)hydantoin, 1,3-bis(hydrazinocarbonoethyl)-5-methylhydantoin, 1,3-bis(hydrazinocarbonoethyl)-5,5-dimethylhydantoin, 1,3-bis(hydrazinocarbonoethyl)-5-isopropylhydantoin, and the like. The hydantoin may have one or two substituents at position 5 (a linear or branched alkyl group having 1 to 6 carbon atoms such as a methyl group or an aryl group having 6 to 10 carbon atoms such as a phenyl group) and two substituents at position 5 may be taken together with a carbon atom at position 5 to form a ring. Preferably, 1,3-bis(hydrazinocarbonoethyl)-5-isopropylhydantoin is used. The (C) hydantoin compound of the present invention suppresses the mold deposit when used in combination with the (B) aliphatic carboxylic hydrazide of the present invention. In particular, a greater effect is obtained when used in combination with sebacic dihydrazide.

In the present invention, the (C) hydantoin compound is added in an amount of 0.001 to 0.50 parts by mass and preferably 0.01 to 0.30 parts by mass relative to 100 parts by mass of the (A) polyacetal polymer.

Furthermore, in the present invention, the effects of the present invention can be achieved as long as both the (B) aliphatic carboxylic hydrazide and the (C) hydantoin compound are contained, but the total amount thereof is preferably 0.03 to 0.55 parts by mass relative to 100 parts by mass of the (A) polyacetal polymer. A content mass ratio of the (B) to (C) is preferably (B):(C)=10:90 to 99:1.

<(D) Alkaline Earth Metal Salt of Aliphatic Carboxylic Acid>

An aliphatic carboxylic acid constituting a (D) alkaline earth metal salt of an aliphatic carboxylic acid of the present invention may be a saturated aliphatic carboxylic acid or an unsaturated aliphatic carboxylic acid. Examples of such an aliphatic carboxylic acid may include a monovalent or divalent aliphatic carboxylic acid having 10 or more carbon atoms such as a monovalent saturated aliphatic carboxylic acid having 10 or more carbon atoms [a saturated aliphatic carboxylic acid having 10 to 34 carbon atoms (preferably a saturated aliphatic carboxylic acid having 10 to 30 carbon atoms) such as capric acid, lauric acid, myristic acid, pentadecylic acid, palmitic acid, stearic acid, arachidic acid, behenic acid, montanic acid, etc.], a monovalent unsaturated aliphatic carboxylic acid having 10 or more carbon atoms [an unsaturated aliphatic carboxylic acid having 10 to 34 carbon atoms (preferably an unsaturated aliphatic carboxylic acid having 10 to 30 carbon atoms) such as oleic acid, linoleic acid, linolenic acid, arachidonic acid, erucic acid, etc.], a divalent aliphatic carboxylic acid having 10 or more carbon atoms (dibasic aliphatic carboxylic acid) [a divalent saturated aliphatic carboxylic acid having 10 to 30 carbon atoms (preferably a divalent saturated aliphatic carboxylic acid having 10 to 20 carbon atoms) such as sebacic acid, dodecanoic acid, tetradecanoic acid, thapsic acid, etc.], a divalent unsaturated aliphatic carboxylic acid having 10 or more carbon atoms [a divalent unsaturated aliphatic carboxylic acid having 10 to 30 carbon atoms (preferably a divalent unsaturated aliphatic carboxylic acid having 10 to 20 carbon atoms) such as decenedioic acid, dodecenedioic acid, etc.].

Furthermore, the above-mentioned aliphatic carboxylic acid includes an aliphatic carboxylic acid in which a portion of hydrogen atoms is substituted with a substituent such as a hydroxyl group and which has one or a plurality of hydroxyl groups in a molecule (e.g., hydroxy saturated aliphatic carboxylic acid having 10 to 26 carbon atoms such as 12-hydroxystearic acid), and also includes aliphatic carboxylic acids having a slightly different number of carbon atoms from those described above depending on accuracy of purification.

In the present invention, an alkaline earth metal is preferably calcium or magnesium and particularly preferably calcium. In the present invention, the alkaline earth metal salt of an aliphatic carboxylic acid is particularly preferably calcium stearate or calcium 12-hydroxystearate.

The alkaline earth metal salt of an aliphatic carboxylic acid is added to the polyacetal resin composition in an amount of 0.001 parts by mass to 0.30 parts by mass and preferably 0.01 to 0.25 parts by mass relative to 100 parts by mass of the (A) polyacetal polymer.

<(E) Hindered Phenol-Based Antioxidant>

In the present invention, an (E) hindered phenol-based antioxidant may be used as a general antioxidant. Examples thereof include a generally used monocyclic hindered phenol compound, a polycyclic hindered phenol compound linked to each other with a hydrocarbon group or a sulfur atom-containing group, and a hindered phenol compound having an ester group or an amide group. Specifically, the compound described in Japanese Unexamined Patent Application, Publication No. 2009-286874 and commercially available compounds such as IRGANOX 1010, IRGANOX 1035, IRGANOX 1076, IRGANOX 1098, IRGANOX 1135, IRGANOX 1330, IRGANOX 1425, IRGANOX 245, IRGANOX 259, IRGANOX 565, and IRGANOX 3114 (all product names, manufactured by BASF JAPAN) may be used.

These hindered phenol-based antioxidants may be used alone or in a combination of two or more. The hindered phenol-based antioxidant is added in an amount of 0.01 to 3 parts by mass relative to 100 parts by mass of the (A) polyacetal polymer.

<Other Additives>

The polyacetal resin composition of the present invention may be further added with a compound selected from a metal oxide and a metal hydroxide in order to improve thermostability, prolong thermostability, etc. The compound is preferably added in an amount of 0.01 to 1 part by mass relative to 100 parts by mass of the (A) polyacetal polymer.

The metal oxide or the metal hydroxide is preferably calcium oxide, magnesium oxide, zinc oxide, calcium hydroxide, magnesium hydroxide, etc.

It is possible and preferred that the polyacetal resin composition of the present invention is further formulated with at least one releasing agent selected from aliphatic carboxylic acid ester, aliphatic carboxylic acid amide, polyoxyalkylene glycol, and a silicone compound in order to improve molding processability, etc. The releasing agent is preferably added in an amount of 0.01 to 1 part by mass relative to 100 parts by mass of the (A) polyacetal polymer.

The polyacetal resin composition of the present invention may be further formulated with one or two or more of a weather resistance (light) stabilizer, an impact resistance modifier, a glossiness controlling agent, a sliding modifier, a filler, a coloring agent, a nucleating agent, an antistatic agent, a surfactant, an antibacterial agent, an antifungal agent, a perfuming agent, a foaming agent, a compatibilizer, a physical property modifier (such as boric acid or its derivatives), a fragrance, etc., as needed, as long as the present invention is not impaired.

A method for producing the polyacetal resin composition of the present invention is not particularly limited and the polyacetal resin composition may be prepared with various methods conventionally known as methods for preparing a resin composition. For example, (1) a method in which all components constituting the composition are mixed together, supplied into an extruder, and melt-kneaded to obtain a pelleted composition; (2) a method in which some of the components constituting the composition and the remaining components are supplied from a main feed port and a side feed port, respectively, of an extruder and melt-kneaded to obtain a pelleted composition; or (3) a method in which pellets having different compositions are firstly prepared by, for example, extrusion and mixing so as to give a predetermined composition, may be employed.

For the preparation of the composition using the extruder, an extruder having one or more devolatilization vent ports is preferably used and, further preferably, about 0.1 to 10 parts by mass of water or a low-boiling point alcohol relative to 100 parts by mass of a polyacetal resin is supplied to any position from the main feed port to the devolatilization vent ports and then formaldehyde and the like generated in an extruding step are removed by devolatilization from the devolatilization vent ports together with the water or the low-boiling point alcohol. Thus, the amount of formaldehyde generated from the polyacetal resin composition and the molded article thereof can be further reduced.

The thus-prepared polyacetal resin composition of the present invention may be molded by conventionally known various molding methods such as injection molding, extrusion molding, compression molding, vacuum molding, blow molding, foam molding, etc.

The present invention also includes recycling a molded article including the polyacetal resin composition and a colored polyacetal resin composition as described above. Specifically, a recycled resin composition which is produced by melt-kneading and extruding a molded article including these resin compositions or a ground product thereof alone or in combination with a resin material having a composition the same as or different from the resin compositions or a molded article thereof; and a recycled molded article which is produced by melt-kneading and molding a molded article including these resin compositions or a ground product thereof alone or in combination with a resin material having a composition the same as or different from the resin compositions or a molded article thereof, are included.

Thus, the recycled resin composition and the recycled molded article have a melt thermal history due to repeated melting, and also only generate formaldehyde at an extremely low level as is the case with the polyacetal resin composition on which the recycled resin composition and the recycled molded article are based.

EXAMPLES

Hereinafter, the present invention will be specifically described with reference to Examples, but the present invention is not limited thereto. Note that, the term "part(s)" in Examples and Comparative Examples means parts by mass. Furthermore, various properties evaluated in the Examples and the Comparative Examples and evaluation methods therefor are as described below. The numerical values in Tables 1 and 2 are described in the unit of parts by mass.

Various components described in Tables 1 and 2 were added and mixed together at a proportion described in Tables 1 and 2 and melt-kneaded with a twin-screw extruder with a vent to thereby prepare pelleted compositions. Note that, for all samples, 0.35 parts by mass of (E) ethylenebis(oxyethylene)bis[3-(5-tert-butyl-4-hydroxy-m-tolyl)propionate] (manufactured by BASF JAPAN, IRGANOX 245) relative to 100 parts by mass of components of the (A) polyacetal polymer was added during the melt-kneading. The various components described in Tables 1 and 2 used in Examples are as follows:

(A) Polyacetal polymer
a-1: a polyacetal copolymer formed by copolymerizing 96.7% by mass of trioxane and 3.3% by mass of 1,3-dioxolane (Melt index (measured at 190° C. and 2160 g load): 27 g/10 min)

(B) Aliphatic carboxylic hydrazide compound
b-1: sebacic dihydrazide
b-2: adipic dihydrazide
b-3: dodecanedioic dihydrazide
(C) Hydantoin compound
c-1: 1,3-bis(hydrazinocarbonoethyl)-5-isopropylhydantoin (manufactured by Ajinomoto Fine-Techno Co., Inc.; "AJI-CURE" VDH)
(D) Alkaline earth metal salt of aliphatic carboxylic acid
d-1: calcium stearate
d-2: calcium 12-hydroxystearate
<Evaluation>
Characteristics evaluated and evaluation methods in Examples are as follows.
<Evaluation of Amount of Formaldehyde Generated from Molded Article (VOC)>

Flat plate-like test pieces (100 mm*40 mm*2 mmt) were molded using the polyacetal resin compositions prepared in the Examples and the Comparative Examples under the following conditions. Two of the flat plate-like test pieces were enclosed in a 10 L polyvinyl fluoride sampling bag, degassed, added with 4 L of nitrogen, and heated at 65° C. for 2 hours. Then, 3 L of the nitrogen in the sampling bag was withdrawn at 0.5 mL/min. Formaldehyde generated therefrom was adsorbed onto a DNPH (2,4-dinitrophenylhydrazine) collecting tube (manufactured by Waters, Sep-Pak DNPH-Silica).

Thereafter, a reaction product of DNPH and formaldehyde was solvent-extracted with acetonitrile from the DNPH collecting tube, the amount of formaldehyde generated was determined by a calibration curve method using a standard reference material of the reaction product of DNPH and formaldehyde on a high-performance liquid chromatograph, and the amount of formaldehyde generated per unit mass of the test piece (μg/g) was calculated.

Molding device: FANUC ROBOSHOT α-S100ia (manufactured by FANUC CORPORATION)
Molding conditions: Cylinder temperature (° C.) Nozzle-C1-C2-C3
190 190 180 160° C.
Injection pressure 60 (MPa)
Injection rate 1.0 (m/min)
Mold temperature 80(° C.)
<Evaluation of Mold Deposit (MD)>

Mold deposit test pieces (33 mm*23 mm*1 mmt) were molded using the polyacetal resin compositions prepared in the Examples and the Comparative Examples under the following conditions.
[Evaluation Method]

After continuously molding for 5000 shots, a surface of a cavity portion of a mold was visually observed and visually determined for a deposit amount according to the following criteria:
Excellent (Ex): No deposit was observed.
Good (G): Almost no deposit was observed.
Fair (Fa): Deposit was observed on some areas.
Poor (P): Deposit was observed overall.
Very poor (VP): Large amount of deposit was observed overall.
Molding device: FANUC ROBOSHOT S-2000i 50B (manufactured by FANUC CORPORATION)
Molding conditions: Cylinder temperature (° C.) Nozzle-C1-C2-C3
205 215 205 185° C.
Injection pressure 40 (MPa)
Injection rate 1.5 (m/min)
Mold temperature 80(° C.)

TABLE 1

| | | Example | | | | | | | | | | |
|---|---|---|---|---|---|---|---|---|---|---|---|---|
| | | 1 | 2 | 3 | 4 | 5 | 6 | 7 | 8 | 9 | 10 | 11 |
| (A) Polyacetal polymer | a-1 | 100 | 100 | 100 | 100 | 100 | 100 | 100 | 100 | 100 | 100 | 100 |
| (B) Sebacic dihydrazide | b-1 | 0.25 | 0.25 | 0.35 | 0.05 | 0.25 | 0.30 | 0.25 | 0.25 | 0.05 | | |
| (B) Adipic dihydrazide | b-2 | | | | | | | | | | 0.25 | |
| (B) Dodecanedioic dihydrazide | b-3 | | | | | | | | | | | 0.25 |
| (C) Hydantoin compound | c-1 | 0.05 | 0.05 | 0.05 | 0.45 | 0.25 | 0.005 | 0.05 | 0.05 | 0.01 | 0.05 | 0.05 |
| (D) Alkaline earth metal salt | d-1 | 0.05 | | 0.05 | 0.05 | 0.05 | 0.05 | 0.2 | 0.005 | 0.05 | 0.05 | 0.05 |
| (D) Alkaline earth metal salt | d-2 | | 0.05 | | | | | | | | | |
| VOC(μg/g) | | 0.02 | 0.05 | 0.01 | 0.01 | 0.01 | 0.02 | 0.08 | 0.03 | 0.50 | 0.04 | 0.03 |
| MD | | Ex | Ex | Ex | Ex | Ex | Ex | Ex | Ex | Ex | G | G |

TABLE 2

| | | Comparative Example | | | | | | |
|---|---|---|---|---|---|---|---|---|
| | | 1 | 2 | 3 | 4 | 5 | 6 | 7 |
| (A) Polyacetal polymer | a-1 | 100 | 100 | 100 | 100 | 100 | 100 | 100 |
| (B) Sebacic dihydrazide | b-1 | 0.25 | | 0.55 | 0.005 | 0.45 | 0.25 | 0.25 |
| (B) Adipic dihydrazide | b-2 | | | | | | | |
| (B) Dodecanedioic dihydrazide | b-3 | | | | | | | |
| (C) Hydantoin compound | c-1 | | 0.60 | 0.05 | 0.50 | 0.25 | 0.05 | 0.10 |
| (D) Alkaline earth metal salt | d-1 | 0.05 | 0.05 | 0.05 | 0.05 | 0.05 | | 0.5 |
| (D) Alkaline earth metal salt | d-2 | | | | | | | |
| VOC(μg/g) | | 0.05 | 0.02 | 0.01 | 0.02 | 0.01 | 0.05 | 0.8 |
| MD | | P | Fa | VP | Fa | P | VP | Fa |

As described above, it is clear that the amounts of both formaldehyde and the mold deposit generated can be stably suppressed within the scope of the composition of the present invention.

The invention claimed is:

1. A polyacetal resin composition comprising at least:
   100 parts by mass of (A) a polyacetal polymer;
   0.05 to 0.35 parts by mass of (B) an aliphatic carboxylic hydrazide selected from the group consisting of adipic dihydrazide, sebacic dihydrazide, dodecanedioic acid dihydrazide, and stearic hydrazide;
   0.005 to 0.45 parts by mass of (C) 1,3-bis(hydrazinocarbonoethyl)-5-isopropylhydantoin; and
   0.005 to 0.2 parts by mass of (D) an alkaline earth metal salt of an aliphatic carboxylic acid,
   a total amount of the (B) and the (C) being 0.03 to 0.55 parts by mass relative to 100 parts by mass of the (A) polyacetal polymer.

2. The polyacetal resin composition according to claim 1, wherein the (B) aliphatic carboxylic hydrazide is sebacic dihydrazide.

3. The polyacetal resin composition according to claim 1, wherein the (D) alkaline earth metal salt of an aliphatic carboxylic acid is at least one selected from calcium stearate and calcium 12-hydroxystearate.

* * * * *